(12) United States Patent
Bhattacharyya et al.

(10) Patent No.: US 12,323,471 B2
(45) Date of Patent: Jun. 3, 2025

(54) METHOD AND SYSTEM FOR MANAGING MULTIMEDIA EXCHANGE IN TELE-ROBOTICS USING DEW COMPUTING

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 15 days.

(21) Appl. No.: 18/403,890

(22) Filed: Jan. 4, 2024

(65) Prior Publication Data
US 2024/0244092 A1    Jul. 18, 2024

(30) Foreign Application Priority Data

Jan. 13, 2023  (IN) .............................. 202321002862

(51) Int. Cl.
| | | |
|---|---|---|
| *H04L 65/1069* | (2022.01) | |
| *H04L 65/1108* | (2022.01) | |
| *H04L 67/12* | (2022.01) | |

(52) U.S. Cl.
CPC ...... *H04L 65/1069* (2013.01); *H04L 65/1108* (2022.05); *H04L 67/12* (2013.01)

(58) Field of Classification Search
CPC ... H04L 65/1069; H04L 65/1108; H04L 67/12
USPC ......................................................... 709/227
See application file for complete search history.

(56) References Cited

PUBLICATIONS

Alessio Botta et al., "Networking for Cloud Robotics: The DewROS Platform and Its Application," Journal of Sensors and Actuator Networks, 2021, vol. 10; Issue: 2, Publisher: MDPI, https://www.mdpi.com/2224-2708/10/2/34/htm.
Alessio Botta et al., "Cloud, Fog, and Dew Robotics: architectures for next generation applications," 7th IEEE International Conference on Mobile Cloud Computing, Date: 2019, IEEE Computer Society, https://ieeexplore.ieee.org/document/8710727.
Marjan Gusev, "A Dew Computing Solution for IoT Streaming Devices," MIPRO, 2017.

*Primary Examiner* — Glenford J Madamba
(74) *Attorney, Agent, or Firm* — Finnegan, Henderson, Farabow, Garrett & Dunner, LLP

(57) ABSTRACT

Currently available live media distribution systems have to continuously maintain multiple peer-to-peer (P2P) connections which further increases the computational load of robot. Present disclosure provides a method and a system for managing multimedia exchange in tele-robotics using dew computing. The system first identifies a dew signaling server wherein a tele-presence robot device present in enterprise network offer to act as dew signaling server. The system then establishes first P2P connection between dew interface and dew signaling server. Thereafter, system establishes second P2P connection between dew signaling server and cloud media manager present in public cloud server. Further, system identifies computing device present in enterprise network as dew media manager. The system then establishes third P2P connection between dew media manager and the cloud media manager via the cloud signaling server. The dew media manager then perform multimedia exchange within one or more enterprise user devices connected to enterprise network.

18 Claims, 4 Drawing Sheets

METHOD AND SYSTEM FOR MANAGING MULTIMEDIA EXCHANGE IN TELE-ROBOTICS USING DEW COMPUTING

PRIORITY CLAIM

This U.S. patent application claims priority under 35 U.S.C. § 119 to: Indian Patent Application No. 202321002862, filed on Jan. 13, 2023. The entire contents of the aforementioned application are incorporated herein by reference.

TECHNICAL FIELD

The disclosure herein generally relates to live media distribution, and, more particularly, to a method and a system for managing multimedia exchange in tele-robotics using dew computing technique.

BACKGROUND

Tele-robotics are used in different business domains. An enterprise may employ same tele-robotics infrastructure in different functionalities and settings. Tele-robotics help businesses to work in a better way and helps in completing work faster. In a situation where physically meeting is challenging, tele-robotics help in bridging the gap. As an instance, tele-robotics plays a key role in a remote office setup. Tele-robotics help in improving business communication between employees, clients and stakeholders. The interaction between entities in business communication becomes easy with the help of tele-robotics. Tele-robots help remote workers to collaborate and work together in an easier and unprecedented way. It enables remote workers gain visual and audio access to those who are present in the room thereby helping in reducing communication gaps. Tele-robotics are used in a wide range of industries such as health care, education, retail and so.

Popular technologies being used in tele-robotics are cloud-robotics, edge-cloud hybrid systems and web browser based real time communication. Cloud robotics are popular because of computing and storage constraints. However, too much cloud centricity not only increases the overall latency in getting the decision outcome, but also adds a certain probability of uncertainty in performance. Further, to mitigate the uncertainties and latency due to cloud only systems, edge cloud hybrid systems are considered as the latency in communicating to an edge is significantly lower than the cloud. Additionally, the edge node has enough capacity so that significant amount of computation load due to cognitive decision making can be offloaded to the edge. Also, certain amount of data requiring frequent access may be cached in the edge as well. However, such edge based systems increases the capital expenditure for a system. Also, it adds to the operating expenditure for maintaining and managing the edge infrastructure.

Nowadays, web browser based real-time communication has been considered for both multi-media and command exchange over the Internet between an operator and a robot. Web Real-Time Communication (WebRTC) is designed as a peer-to-peer (P2P) communication protocol suit for exchange of multi-media between two endpoints across the internet. WebRTC Application Programming Interfaces (APIs) allow the end-applications to establish end-to-end (E2E) low latency channel over a P2P association of the robot with an operator. However, if any one or both robot and operator nodes are behind restrictive network address translators (NATs) then establishing a direct P2P is not possible. In such cases, the P2P connection must be relayed through a special server called Traversal Using Relays around NAT (TURN) server. Most tele-robotic solutions work in a P2P topology whereby only one operator connects the robot. But, for multiparty tele-robotic sessions, all the participating entities including the robot need to connect through a central conferencing server residing in the cloud. This effectively leads to multiple P2P connections converging into a star-like topology. The cloud-centric topology is bound to cause delay leading to unpredictable increase in latency while transferring control commands, as well as while exchanging the visual feedback. The delay in transferring commands cause problems during live media distribution/multimedia exchange happening in the telerobotic session.

SUMMARY

Embodiments of the present disclosure present technological improvements as solutions to one or more of the above-mentioned technical problems recognized by the inventors in conventional systems. For example, in one aspect, there is provided a system for managing multimedia exchange in tele-robotics using dew computing. The system comprises a public cloud server communicatively coupled to an enterprise network, the public cloud server comprising a first memory configured to store a first set of instructions, and a first set of processors coupled to the first memory via a first set of communication interfaces, wherein the first set of processors is serving as a cloud signaling server and a cloud media manager; and a tele-presence robot device communicatively coupled to the public cloud server via the enterprise network, the tele-presence robot device comprising: a second memory configured to store a second set of instructions and a second set of processors coupled to the second memory via a second set of communication interfaces, wherein the first set of processors is configured by the first set of instructions to: receive a connection request from the tele-presence robot device via the cloud signaling server, wherein the connection request comprises an offer to act as a dew signaling server; instantiate a dew interface at the public cloud server based on the connection request; establish a first peer-to-peer (P2P) connection between the dew interface and the dew signaling server; establish a second P2P connection between the dew signaling server and the cloud media manager via the cloud signaling server based on the first P2P connection; identify a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager; send dew media manager information to the cloud signaling server via the dew signaling server; establish a third P2P connection between the dew media manager and the cloud media manager via the cloud signaling server based on the dew media manager information; transfer a script to instantiate a media management logic into the dew media manager via the cloud media manager using the third P2P connection; and perform multimedia exchange within one or more enterprise user devices connected to the enterprise network via the dew media manager.

In another aspect, there is provided a processor implemented method for managing multimedia exchange in tele-robotics using dew computing. The method comprises receiving a connection request from the tele-presence robot device via the cloud signaling server, wherein the connection request comprises an offer to act as a dew signaling server; instantiating a dew interface at the public cloud server based on the connection request; establishing a first peer-to-peer (P2P) connection between the dew interface and the dew signaling server; establishing a second P2P connection between the dew signaling server and the cloud media manager via the cloud signaling server based on the first P2P connection; identifying a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager; sending dew media manager information to the cloud signaling server via the dew signaling server; establishing a third P2P connection between the dew media manager and the cloud media manager via the cloud signaling server based on the dew media manager information; transferring a script to instantiate a media management logic into the dew media manager via the cloud media manager using the third P2P connection; and perform multimedia exchange within one or more enterprise user devices connected to the enterprise network via the dew media manager.

In yet another aspect, there are provided one or more non-transitory machine-readable information storage mediums comprising one or more sets of instructions which when executed by one or more sets of processors cause a method for multimedia exchange in tele-robotics using dew computing. The method comprises receiving a connection request from the tele-presence robot device via the cloud signaling server, wherein the connection request comprises an offer to act as a dew signaling server; instantiating a dew interface at the public cloud server based on the connection request; establishing a first peer-to-peer (P2P) connection between the dew interface and the dew signaling server; establishing a second P2P connection between the dew signaling server and the cloud media manager via the cloud signaling server based on the first P2P connection; identifying a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager; sending dew media manager information to the cloud signaling server via the dew signaling server; establishing a third P2P connection between the dew media manager and the cloud media manager via the cloud signaling server based on the dew media manager information; transferring a script to instantiate a media management logic into the dew media manager via the cloud media manager using the third P2P connection; and perform multimedia exchange within one or more enterprise user devices connected to the enterprise network via the dew media manager.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
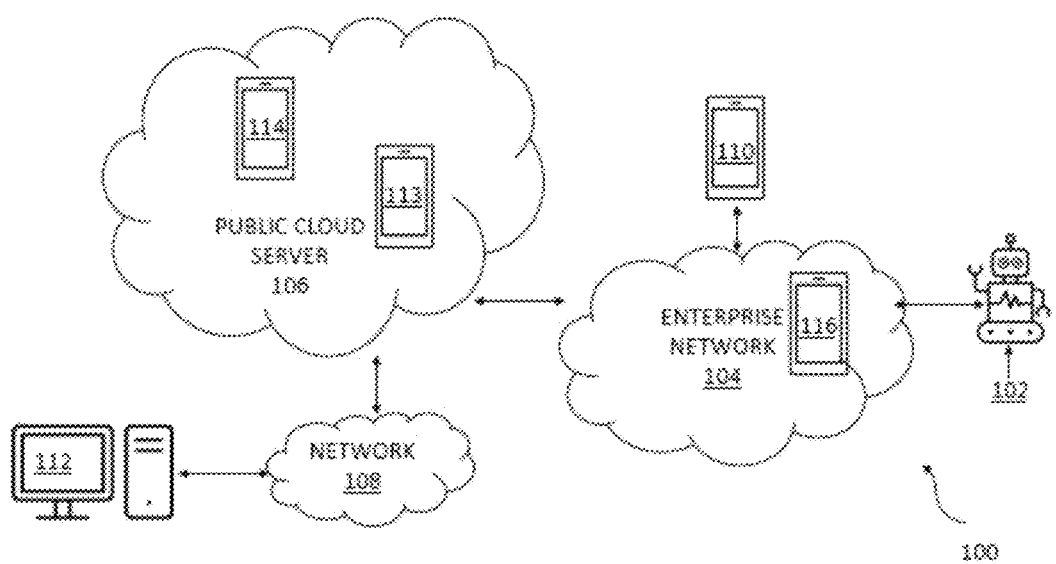
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As discussed earlier, popular technology that is available currently for facilitating exchange of multimedia between two endpoints across the Internet is WebRTC as it allows the end-application to establish end-to-end low latency channel over a P2P association of the robot with the operator. However, if any one or both robot and operator nodes are behind restrictive NATs, then establishing a direct P2P is not possible. And, in such cases, the P2P connection is relayed through a special server called TURN server. Currently, most of the telerobotic solutions that are working in a P2P topology allow only one operator to connect with the robot. So, in cases where multiple parties want to connect with the robot simultaneously, a central conferencing server residing in the cloud is used. The use of central conferencing server for forming multiparty connection further leads to multiple P2P connections that ultimately converge into a star-like topology. And that somehow breaks the true sense of P2P that one would like to leverage through WebRTC APIs as cloud-centric topology is bound to cause delay which further leads to unpredictable increase in latency while transferring control commands, as well as while exchanging the visual feedback.

Additionally, some available techniques use edge-cloud based hybrid architecture for a multi-user scenario. Basically, the edge-cloud based hybrid architecture uses a session manager and a media broadcaster in the cloud for facilitating multi-party connection. However, these techniques still have the cloud-centric signaling delay and uncertainty, and the delay in exchange of multimedia, which further reduces the synergy between the control commands transferred over low-latency P2P path and the visual feedback transferred via the cloud.

So, a technique that can efficiently manage multimedia aggregation and distribution while reducing cloud-centric overhead is still to be explored.

Embodiments of the present disclosure overcome the above-mentioned disadvantages by providing a system and a method for multimedia exchange in tele-robotics using dew computing. The system of the present disclosure first identifies a dew signaling server wherein a tele-presence robot device present in the enterprise network offers to act as the dew signaling server. The system then instantiates a dew interface at a public cloud server and establishes a first peer-to-peer (P2P) connection between the dew interface present at the public cloud server and the dew signaling server i.e., the tele-presence robot device. Thereafter, the system establishes a second P2P connection between the dew signaling server and a cloud media manager present in the public cloud server via the cloud signaling server. Once the second P2P connection is established, the system identifies a computing device present in an enterprise network as a dew media manager. The dew media manager information is then shared with the cloud signaling server via the dew signaling server.

Further, once the dew media manager is available, the system establishes a third P2P connection between the dew media manager and the cloud media manager via the cloud signaling server. A media management logic is then instantiated into the dew media manager via the cloud media manager using the third P2P connection. The dew media manager then performs multimedia exchange within one or more enterprise user devices connected to the enterprise network.

Additionally, the system also collects one or more media streams originating from the one or more enterprise user devices via the dew media manager which are then shared with the cloud media manager via the dew media manager. The cloud media manager then shares the media stream with non-enterprise user devices associated with non-enterprise users of the enterprise network.

In the present disclosure, the system and the method use the dew media manager which is part of the enterprise network to perform multimedia exchange within one or more enterprise user devices that are connected to the enterprise network, thereby ensuring improved quality of experience for enterprise users while reducing the cloud centric overhead as the device present within the enterprise network is handling the multimedia exchange. Further, the tele-presence robot device can be stopped urgently by the enterprise in case it is observed that the action of the tele-presence robot device is posing as a threat for the enterprise users.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary representation of an environment 100 for managing multimedia exchange in tele-robotics using dew computing related to at least some example embodiments of the present disclosure. Although the environment 100 is presented in one arrangement, other embodiments may include the parts of the environment 100 (or other parts) arranged otherwise depending on, for example, establishment of peer-to-peer (P2P) connection, performing signaling negotiations, etc. The environment 100 generally includes a tele-presence robot device, such as a tele-presence robot device 102, and a public cloud server 106, each in communication with an enterprise network 104. The public cloud server 106 is also in communication with a network 108.

In an embodiment, the public cloud server 106 is a shared platform to deliver computing services, such as applications, virtual machines, storage etc. by third party service providers through the Internet. Examples of the public cloud server 106 include, but are not limited to, Amazon elastic compute cloud (EC2), Microsoft Azure™, IBM's™ blue cloud, sun cloud, and Google™ cloud.

In an embodiment, the enterprise network 104 refers to a network that is created to fulfill network needs, such as data exchange, and running business processes of a large organization.

The enterprise network 104 and the network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the enterprise network 104 and the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The public cloud server 106 includes a cloud signaling server 113 and a cloud media manager 114. The tele-presence robot device 102 sends a connection request to the public cloud server 106 via the enterprise network 104 and the cloud signaling server 113. In an embodiment, the connection request includes an offer to act as a dew signaling server. The public cloud server 106, upon receiving the connection request, instantiates a dew interface at the public cloud server 106 based on the connection request. Thereafter, the public cloud server 106 considers the tele-presence robot device 102 as the dew signaling server.

Further, any arbitrary node i.e., any computing device 116 that is joining the enterprise network 104 is considered as the dew media manager (herein after referred as the dew media manager 116). The environment 100 also includes an enterprise user device 110 connected with the enterprise network 104, and a non-enterprise user device 112 connected to the network 108. It should be noted that one enterprise user device and one non-enterprise user device is shown for the sake of explanation; there can be more number of enterprise and non-enterprise user devices.

The enterprise user device 110 is associated with an enterprise user (e.g., an employee working for an entity such as an organization) who wants to establish a telerobotic session for performing multimedia exchange within the enterprise network 104. The non-enterprise user device 112 is associated with a non-enterprise user (e.g., external stakeholders, such as clients, vendors, certification authorities, etc.) who wants to receive media streams that are shared within the enterprise network from outside the enterprise network. Examples of the enterprise user device 110 and the non-enterprise user device 112 include, but are not limited to, a personal computer (PC), a mobile phone, a tablet device, a Personal Digital Assistant (PDA), a server, a voice activated assistant, a smartphone, and a laptop.

The dew media manager 116 and the cloud media manager 114 help in performing the multi-media communication/exchange with the enterprise user devices, such as enterprise user device 110 as well as the non-enterprise user devices, such as the non-enterprise user device 112. The details of how the multimedia exchange is performed is discussed in detail with reference to FIGS. 4A and 4B.

The number and arrangement of clouds, devices, and/or networks shown in FIG. 1 are provided as an example. There may be additional clouds, devices, and/or networks; fewer clouds, devices, and/or networks; different clouds, devices, and/or networks; and/or differently arranged clouds, devices, and/or networks than those shown in FIG. 1. Furthermore, two or more devices shown in FIG. 1 may be implemented within a single device, or a single device shown in FIG. 1 may be implemented as multiple, distributed systems or devices. Additionally, or alternatively, a set of devices (e.g., one or more devices) of the environment 100 may perform one or more functions described as being performed by another set of systems or another set of devices of the environment 100 (e.g., refer scenarios described above).

Figure 2:
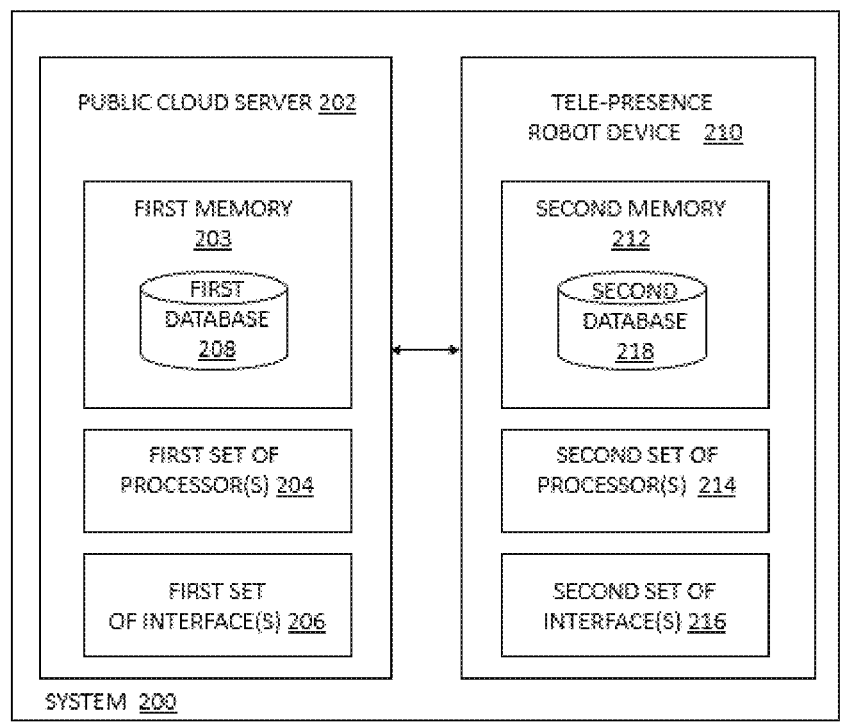
FIG. 2 illustrates an exemplary block diagram of a system for managing multimedia exchange in tele-robotics using dew computing, in accordance with an embodiment of the present disclosure.

FIG. 2 illustrates an exemplary block diagram of a system 200 managing multimedia exchange in tele-robotics using dew computing, in accordance with an embodiment of the present disclosure. In some embodiments, the system 200 is embodied as a cloud-based and/or software as a service (SaaS) based architecture. In some embodiments, the system 200 may be implemented in a server system. In some embodiments, the system 200 may be implemented in a variety of computing systems, such as laptop computers, notebooks, hand-held devices, workstations, mainframe computers, servers, a network cloud and the like.

In an embodiment, the system 200 includes a public cloud server 202 (also referred as public cloud server 106 in FIG. 1), and tele-presence robot device 210 (also referred as the tele-presence robot device 102 in FIG. 1) that is communicatively coupled to the public cloud server 202 via an enterprise network (also referred as the enterprise network 104 in FIG. 1).

In at least one example embodiment, the public cloud server 202 includes a first set of processors 204, a first set of communication interface device(s) or input/output (I/O) interface(s) 206, and one or more data storage devices or first memory 203 operatively coupled to the first set of processors 204.

In at least one example embodiment, the tele-presence robot device 210 includes a second set of processors 214, a second set of communication interface device(s) or input/output (I/O) interface(s) 216, and one or more data storage devices or a second memory 212 operatively coupled to the second set of processors 214.

The first set of processors 204 and the second set of processors 214 may be one or more software processing modules and/or hardware processors. In an embodiment, the first set of processors 204 and the second set of processors 214 can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The I/O interface device(s) 206 and 216 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 204 and the memory 212 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 208 can be stored in the first memory 203 and a database 218 can be stored in the second memory 212. The memories 203 and 212 further comprise (or may further comprise) information pertaining to input(s)/output(s) of each step performed by the systems and methods of the present disclosure. In other words, input(s) fed at each step and output(s) generated at each step are comprised in the memories 203 and 212 and can be utilized in further processing and analysis.

It is noted that the system 200 as illustrated and hereinafter described is merely illustrative of a system that could benefit from embodiments of the present disclosure and, therefore, should not be taken to limit the scope of the present disclosure. It is noted that the system 200 may include fewer or more components than those depicted in FIG. 2.

Figure 3:
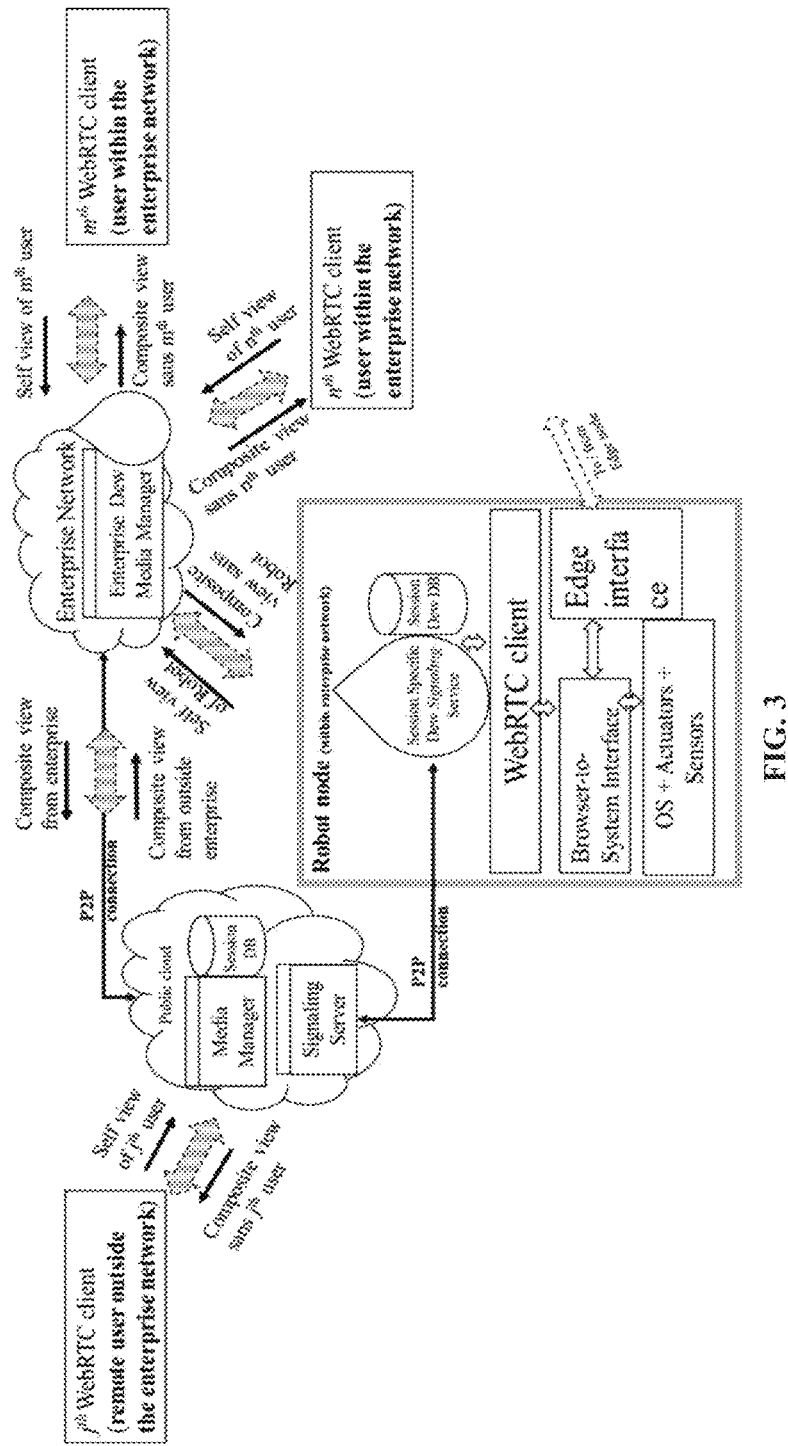
FIG. 3 illustrates a schematic block diagram representation of a multimedia exchange in tele-robotics, in accordance with an embodiment of the present disclosure.

FIG. 3, with reference to FIGS. 1-2, illustrates a schematic block diagram representation 300 of a multimedia exchange managed by the system 200 of FIG. 2, in accordance with an embodiment of the present disclosure.

As seen in FIG. 3, the public cloud server 202 present in the system 200 first receives a connection request from the tele-presence robot device 210 via the cloud signaling server 113. The connection request includes an offer to act as a dew signaling server. Based on the connection request, the system 200 instantiates a dew interface at the public cloud server 202 and then establishes a first peer-to-peer connection (P2P) between the dew interface and the dew signaling server i.e., the tele-presence robot device 210. Then, using the first P2P connection, the system 200 establishes a second P2P connection between the dew signaling server and the cloud media manager 114 via the cloud signaling server 113. Thereafter, the system 200 identifies a computing device (e.g., the computing device 116) present in the enterprise network 104 as a dew media manager (hereinafter also referred as the dew media manager 116). In an embodiment, the identification is performed based on a session joining request received by the tele-presence robot device 102 from the computing device 116 offering to act as the dew media manager 116.

Once the dew media manager 116 is identified, the dew media manager information is shared with the cloud signaling server 113 via the dew signaling server. Thereafter, the system establishes a third P2P connection between the dew media manager 116 and the cloud media manager 114 via the cloud signaling server 113 based on the dew media manager information. Further, using the third P2P connection, the cloud media manager 114 transfers a script to the dew media manager 116 to instantiate a media management logic into the dew media manager 116. Once the media management logic is instantiated in the dew media manager 116, the dew media manager 116 performs multi-media exchange within one or more enterprise user devices, such as the enterprise user device 110 connected the enterprise network 104.

Additionally, the public cloud server 202 present in the system 200 collects media streams originating from the one or more enterprise user devices via the dew media manager 116 and then sends the collected media streams to the cloud media manager 114. The cloud media manager 114 then shares the media streams with the non-enterprise user devices, such as the non-enterprise user device 112.

Figure 4A:
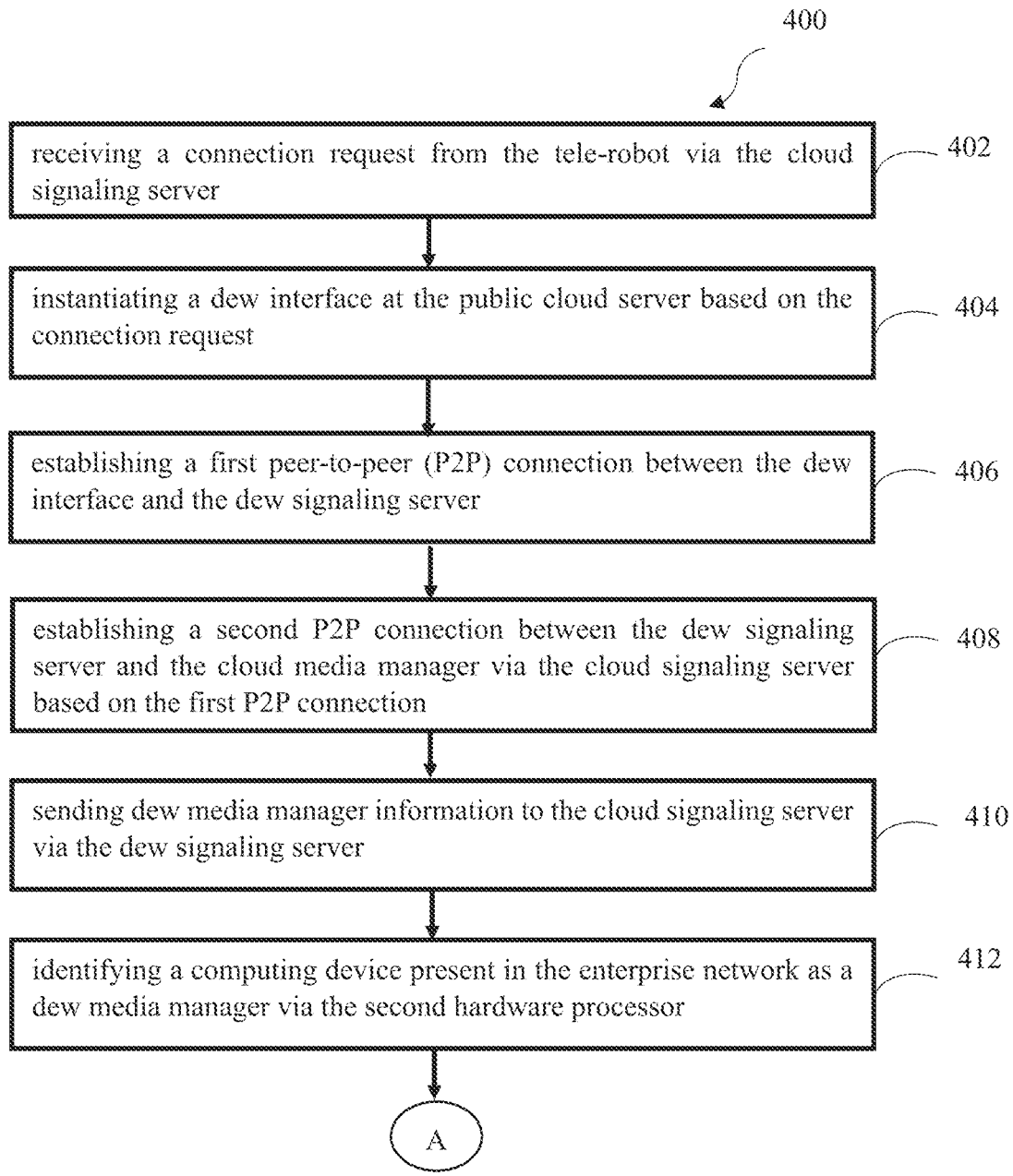
FIGS. 4A and 4B, collectively, illustrate an exemplary flow diagram of a method for managing multimedia exchange in tele-robotics using dew computing, in accordance with an embodiment of the present disclosure.
Figure 4B:
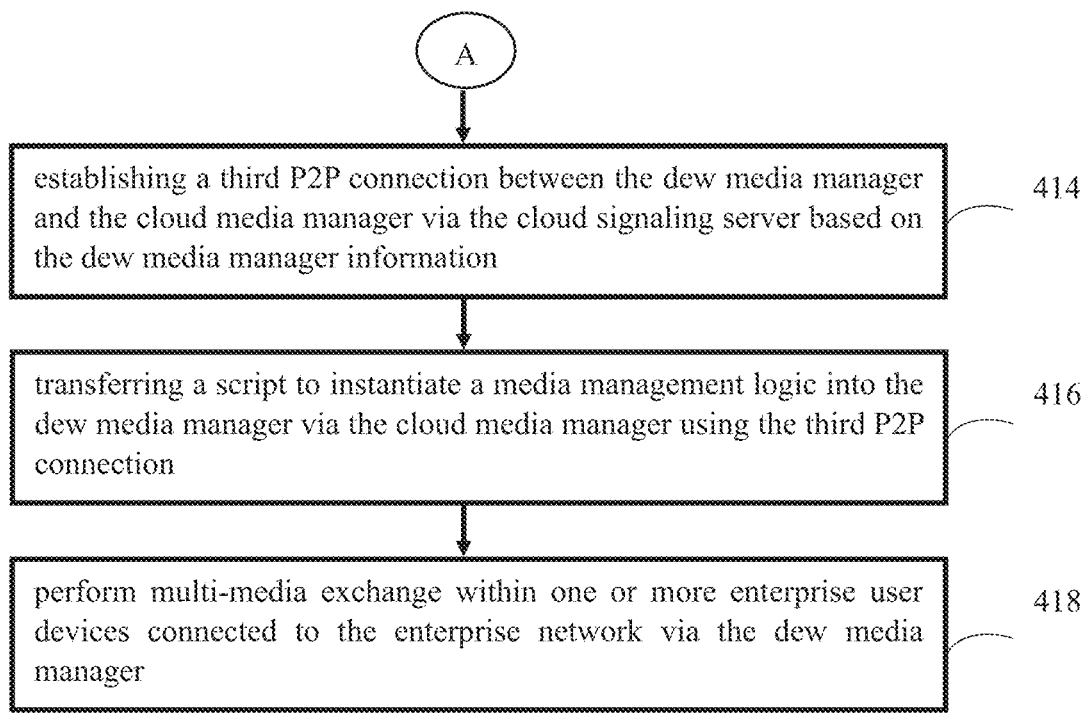

FIG. 4A and FIG. 4B, with reference to FIGS. 1 through 3, represent an exemplary flow diagram of a method 400 for managing multimedia exchange in tele-robotics using dew computing, in accordance with an embodiment of the present disclosure. The method 400 may use the system 200 of FIG. 2 for execution. In an embodiment, the system 200 comprises one or more data storage devices or the first memory 203 and the second memory 212 operatively coupled to the first set of processors 204 and the second set of processors 214, respectively. The first memory 203 and the second memory 212 is configured to store first and second set of instructions, respectively for execution of steps of the method 400 by the first set and the second set of processors 204/214. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2.

At step 402 of the method of the present disclosure, the first set of processors 204 of the system 200 receives a connection request from the tele-presence robot device 102 via the cloud signaling server 113. The connection request includes an offer to act as a dew signaling server. In particular, the connection request includes the offer to use available resources of the tele-presence robot device 102 to institute a dew service i.e., to use them for instituting the dew signaling server.

At step 404 of the method of the present disclosure, the first set of processors 204 of the system 200 instantiates a dew interface at the public cloud server 202 based on the received connection request. It should be noted that the dew interface at the public cloud server 202 is instantiated by the cloud media manager 114.

At step 406 of the method of the present disclosure, the first set of processors 204 of the system 200 establishes a first peer-to-peer (P2P) connection between the dew interface and the dew signaling server 102. In particular, the first P2P connection is established between the dew interface and the tele-presence robot device 102.

At step 408 of the method of the present disclosure, the first set of processors 204 of the system 200 establishes a second P2P connection between the dew signaling server 102 and the cloud media manager 114 via the cloud signaling server 113 based on the first P2P connection.

At step 410 of the method of the present disclosure, the first set of processors 204 of the system 200 identifies a computing device (e.g., the computing device 116) present in the enterprise network 104 as a dew media manager via the second hardware processor 214. In particular, the identification is performed based on the session joining request send by the computing device 116 to the tele-presence robot device 102. The session joining request includes an offer to act as the dew media manager. In particular, the session joining request includes the offer to use available resources of the computing device 116 for instituting the dew media manager.

At step 412 of the method of the present disclosure, the first set of processors 204 of the system 200 sends the dew media manager information to the cloud signaling server 113 via the dew signaling server 102. In particular, which node among a plurality of nodes i.e., computing devices that are connected to the enterprise network 104 is identified as the dew media manager. So, the dew media manager information includes node details of the dew media manager.

At step 414 of the method of the present disclosure, the first set of processors 204 of the system 200 establishes a third P2P connection between the dew media manager and the cloud media manager 114 via the cloud signaling server 113 based on the dew media manager information. Once the dew media manager information is available, the third P2P connection is established between the node identifies as the dew media manager and the cloud media manager 114 via the cloud signaling server 113. In particular, the cloud signaling server 113 notifies the cloud media manager 114 with a special dew media manager identifier for the third P2P connection.

At step 416 of the method of the present disclosure, the first set of processors 204 of the system 200 transfers a script to instantiate a media management logic into the dew media manager via the cloud media manager 114 using the third P2P connection. In an embodiment, the script is a software program that includes the media management logic.

At step 418 of the method of the present disclosure, the first set of processors 204 of the system 200 performs multimedia exchange within one or more enterprise user devices, such as the enterprise user device 110 connected to the enterprise network 104 via the dew media manager. It should be noted that the prior to performing the multimedia exchange within the one or more enterprise user devices, the second set of processors 114 is configured by the second set of instructions to redirect one or more connection requests received from the one or more enterprise user devices to the dew media manager via an enterprise proxy.

In an embodiment, the second set of processors 214 collects one or more media streams originating from the one or more enterprise user devices via the dew media manager. Once the media streams are collected, the second set of processors 214 sends the collected one or more media streams to the cloud media manager 114 via the dew media manager. The cloud media manager 112 then shares at least one media stream of the one or more media streams with at least one non-enterprise user device, such as the non-enterprise user device 112 of the one or more non-enterprise user devices associated with a non-enterprise user of the enterprise network 104. In particular, the cloud media manager 112 performs the multimedia exchange with the one or more non-enterprise user devices.

Further, the first set of processors 204 collects the one or more media streams originating from the one or more non-enterprise user devices via the cloud media manager. The media streams include, but are not limited to, audio streams, video streams and so on. Thereafter, the collected one or more media streams are sent to the dew media manager via the cloud media manager. The dew media manager then shares the at least one media stream with at least one enterprise user device, such as the enterprise user device 110 associated with an enterprise user of the enterprise network 104.

Additionally, when the script to instantiate the media management logic is transferred to the dew media manager via cloud media manager using the third P2P connection, the second set of processors 214 is configured by the second set of instructions to send a P2P disconnection request to the cloud signaling server 113 via the dew interface. The P2P disconnection request is sent by the dew signaling server

102 upon determining that the dew media manager is handling the multi-media exchange with the one or more enterprise user devices.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, the available techniques are cloud-centric in which the cloud maintains the multiple P2P connection with the robot for performing video aggregation and distribution which increases the computational load of the robot/tele-presence robot device. So, to overcome the disadvantages, embodiments of the present disclosure provide a method and a system that use a cloud-dew architecture for an efficient live media distribution. The method considers a node/computing device within the enterprise network as a dew media manager for multimedia management and distribution. The tele-presence robot device acts as a dew signaling server and helps in establishing P2P connection of all nodes connecting from within the enterprise network with the dew media manager. All media streams from the enterprise network users are passed through the dew media manager. The dew media manager then receives media streams from outside enterprise network users from a cloud media manager inside the public cloud server. In a similar way, the public cloud also receives media streams from within enterprise network users and distributes to the outside enterprise network users. Thus, the method of the present disclosure helps in reducing a lot of cloud-centric overhead during multi-media conferencing in tele-robotics session.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system, comprising:
   a public cloud server communicatively coupled to an enterprise network, wherein the public cloud server comprising:
     a first memory configured to store a first set of instructions, and
     a first set of processors coupled to the first memory via a first set of communication interfaces, wherein the first set of processors is serving as a cloud signaling server and a cloud media manager; and
   a tele-presence robot device communicatively coupled to the public cloud server via the enterprise network, wherein the tele-presence robot device further comprising:
     a second memory configured to store a second set of instructions, and
     a second set of processors coupled to the second memory via a second set of communication interfaces, wherein the first set of processors is configured by the first set of instructions to:
receive a connection request from the tele-presence robot device via the cloud signaling server, wherein the connection request comprises an offer to act as a dew signaling server;
instantiate a dew interface at the public cloud server based on the connection request;
establish a first peer-to-peer (P2P) connection between the dew interface and the dew signaling server;
establish a second P2P connection between the dew signaling server and the cloud media manager via the cloud signaling server based on the first P2P connection;
identify a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager;
send dew media manager information to the cloud signaling server via the dew signaling server;
establish a third P2P connection between the dew media manager and the cloud media manager via the cloud signaling server based on the dew media manager information;
transfer a script to instantiate a media management logic into the dew media manager via the cloud media manager using the third P2P connection; and
perform multimedia exchange within one or more enterprise user devices connected to the enterprise network via the dew media manager.

2. The system of claim 1, wherein the second set of processors is further configured by the second set of instructions to:
collect one or more media streams originating from the one or more enterprise user devices via the dew media manager; and
send the collected one or more media streams to the cloud media manager via the dew media manager, wherein the cloud media manager shares at least one media stream of the one or more media streams with at least one non-enterprise user device associated with a non-enterprise user of the enterprise network.

3. The system of claim 2, wherein the first set of processors is configured by the first set of instructions to:
perform the multimedia exchange with one or more non-enterprise user devices via the cloud media manager;
collect the one or more media streams originating from the one or more non-enterprise user devices via the cloud media manager; and
send the collected one or more media streams to the dew media manager via the cloud media manager, wherein the dew media manager shares the at least one media stream with at least one enterprise user device associated with an enterprise user of the enterprise network.

4. The system of claim 1, wherein when the script to instantiate a media management logic is transferred to the dew media manager via the cloud media manager using the third P2P connection, the second set of processors is configured by the second set of instructions to:
send a P2P disconnection request to the cloud signaling server via the dew interface, wherein the P2P disconnection request is sent by the dew signaling server upon determining that the dew media manager is handling the multimedia exchange with the one or more enterprise user devices.

5. The system of claim 1, wherein prior to performing the multimedia exchange within the one or more enterprise user devices connected to the enterprise network by the dew media manager, the second set of processors is configured by the second set of instructions to:
redirect one or more connection requests received from the one or more enterprise user devices to the dew media manager via an enterprise proxy.

6. The system of claim 1, wherein the dew media manager information comprises node details of the dew media manager.

7. A processor implemented method, comprising:
receiving a connection request from the tele-presence robot device via the cloud signaling server, wherein the connection request comprises an offer to act as a dew signaling server;
instantiating a dew interface at the public cloud server based on the connection request;
establishing a first peer-to-peer (P2P) connection between the dew interface and the dew signaling server;
establishing a second P2P connection between the dew signaling server and the cloud media manager via the cloud signaling server based on the first P2P connection;
identifying a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager;
sending dew media manager information to the cloud signaling server via the dew signaling server;
establishing a third P2P connection between the dew media manager and the cloud media manager via the cloud signaling server based on the dew media manager information;
transferring a script to instantiate a media management logic into the dew media manager via the cloud media manager using the third P2P connection; and
perform multimedia exchange within one or more enterprise user devices connected to the enterprise network via the dew media manager.

8. The processor implemented method of claim 7, further comprising:
collecting one or more media streams originating from the one or more enterprise user devices via the dew media manager; and
sending the collected one or more media streams to the cloud media manager via the dew media manager, wherein the cloud media manager shares at least one media stream of the one or more media streams with at least one non-enterprise user device associated with a non-enterprise user of the enterprise network.

9. The processor implemented method of claim 8, further comprising:
performing the multimedia exchange with one or more non-enterprise user devices via the cloud media manager;
collecting the one or more media streams originating from the one or more non-enterprise user devices via the cloud media manager; and sending the collected one or more media streams to the dew media manager via the cloud media manager, wherein the dew media manager shares the at least one media stream with at least one enterprise user device associated with an enterprise user of the enterprise network.

10. The processor implemented method of claim 7, wherein the step of transferring the script to instantiate the media management logic into the dew media manager via the cloud media manager using the third P2P connection is succeeded by:

sending a P2P disconnection request to the cloud signaling server via the dew interface, wherein the P2P disconnection request is sent by the dew signaling server upon determining that the dew media manager is handling the multimedia exchange with the one or more enterprise user devices.

11. The processor implemented method of claim 7, wherein the step of performing multimedia exchange within the one or more enterprise user devices connected to the enterprise network via the dew media manager is preceded by:

redirecting one or more connection requests received from the one or more enterprise user devices to the dew media manager via an enterprise proxy.

12. The processor implemented method of claim 7, wherein the dew media manager information comprises node details of the dew media manager.

13. One or more non-transitory machine-readable information storage mediums comprising one or more instructions which when executed by one or more hardware processors cause:

receiving a connection request from the tele-presence robot device via the cloud signaling server, wherein the connection request comprises an offer to act as a dew signaling server;

instantiating a dew interface at the public cloud server based on the connection request;

establishing a first peer-to-peer (P2P) connection between the dew interface and the dew signaling server;

establishing a second P2P connection between the dew signaling server and the cloud media manager via the cloud signaling server based on the first P2P connection;

identifying a computing device present in the enterprise network as a dew media manager via the second hardware processor, wherein the identification is performed based on a session joining request received by the tele-presence robot device, and wherein the telepresence robot receives the session joining request from the computing device offering to act as the dew media manager;

sending dew media manager information to the cloud signaling server via the dew signaling server;

establishing a third P2P connection between the dew media manager and the cloud media manager via the cloud signaling server based on the dew media manager information;

transferring a script to instantiate a media management logic into the dew media manager via the cloud media manager using the third P2P connection; and perform multimedia exchange within one or more enterprise user devices connected to the enterprise network via the dew media manager.

14. The one or more non-transitory machine-readable information storage mediums of claim 13, wherein the one or more instructions which when executed by the one or more hardware processors further cause:

collecting one or more media streams originating from the one or more enterprise user devices via the dew media manager; and sending the collected one or more media streams to the cloud media manager via the dew media manager, wherein the cloud media manager shares at least one media stream of the one or more media streams with at least one non-enterprise user device associated with a non-enterprise user of the enterprise network.

15. The one or more non-transitory machine-readable information storage mediums of claim 14, wherein the one or more instructions which when executed by the one or more hardware processors further cause:

performing the multimedia exchange with one or more non-enterprise user devices via the cloud media manager;

collecting the one or more media streams originating from the one or more non-enterprise user devices via the cloud media manager; and sending the collected one or more media streams to the dew media manager via the cloud media manager, wherein the dew media manager shares the at least one media stream with at least one enterprise user device associated with an enterprise user of the enterprise network.

16. The one or more non-transitory machine-readable information storage mediums of claim 13, wherein the step of transferring the script to instantiate the media management logic into the dew media manager via the cloud media manager using the third P2P connection is succeeded by:

sending a P2P disconnection request to the cloud signaling server via the dew interface, wherein the P2P disconnection request is sent by the dew signaling server upon determining that the dew media manager is handling the multimedia exchange with the one or more enterprise user devices.

17. The one or more non-transitory machine-readable information storage mediums of claim 13, wherein the step of performing multimedia exchange within the one or more enterprise user devices connected to the enterprise network via the dew media manager is preceded by:

redirecting one or more connection requests received from the one or more enterprise user devices to the dew media manager via an enterprise proxy.

18. The one or more non-transitory machine-readable information storage mediums of claim 12, wherein the dew media manager information comprises node details of the dew media manager.

* * * * *